US008205735B2

(12) United States Patent
Behan et al.

(10) Patent No.: US 8,205,735 B2

(45) Date of Patent: Jun. 26, 2012

(54) MONITORING HANDRAILS TO REDUCE FALLS

(75) Inventors: Julie Behan, Monavaha (IE); Terry Dishongh, Portland, OR (US); Karol O'Donovan, Mallow (IE); Adrian Burns, Killeshandra (IE); Simon Roberts, The Moat Rathmoylon (IE)

(73) Assignee: Intel-GE Care Innovations LLC, Roseville, CA (US)

( * ) Notice: Subject to any disclaimer, the term of this patent is extended or adjusted under 35 U.S.C. 154(b) by 941 days.

(21) Appl. No.: 12/214,092

(22) Filed: Jun. 17, 2008

(65) Prior Publication Data

US 2009/0309086 A1 Dec. 17, 2009

(51) Int. Cl.
*B66B 29/04* (2006.01)
*G01N 15/06* (2006.01)

(52) U.S. Cl. ........................................ 198/335; 198/323

(58) Field of Classification Search .................. 198/323, 198/335, 336, 337, 338
See application file for complete search history.

(56) References Cited

U.S. PATENT DOCUMENTS

| | | | | |
|---|---|---|---|---|
| 4,924,995 | A * | 5/1990 | Adrian et al. | 198/323 |
| 4,976,345 | A * | 12/1990 | Adrian et al. | 198/323 |
| 5,001,459 | A * | 3/1991 | Jacoby et al. | 340/568.1 |
| 5,072,820 | A * | 12/1991 | Steffen et al. | 198/323 |
| 5,092,446 | A * | 3/1992 | Sullivan et al. | 198/323 |
| 5,245,315 | A * | 9/1993 | Johnson et al. | 340/541 |
| 5,295,567 | A * | 3/1994 | Zaharia et al. | 198/323 |
| 5,601,178 | A * | 2/1997 | Zaharia et al. | 198/323 |
| 5,645,156 | A * | 7/1997 | Zaharia et al. | 198/323 |
| 5,842,554 | A * | 12/1998 | Stoxen et al. | 198/322 |
| 5,923,005 | A | 7/1999 | Blondiau et al. | |
| 6,015,038 | A * | 1/2000 | Stoxen et al. | 198/322 |
| 6,112,166 | A * | 8/2000 | Joosten | 702/185 |
| 7,404,477 | B1 * | 7/2008 | Toennisson et al. | 198/335 |
| 7,407,048 | B2 * | 8/2008 | Boom | 198/323 |
| 7,552,812 | B2 * | 6/2009 | Gonzalez et al. | 198/338 |
| 7,574,271 | B2 * | 8/2009 | Steindl et al. | 700/21 |

FOREIGN PATENT DOCUMENTS

| | | |
|---|---|---|
| JP | 2001-236580 | 8/2001 |
| JP | 2001-351190 | 12/2001 |
| JP | 2005-158318 | 6/2005 |

OTHER PUBLICATIONS

Korean Patent Office, International Search Report and Written Opinion issued in corresponding PCT Application No. PCT/US2009/046455, 9 pages, Jan. 27, 2010.

* cited by examiner

*Primary Examiner* — Douglas Hess

(74) *Attorney, Agent, or Firm* — Pillsbury Winthrop Shaw Pittman LLP

(57) ABSTRACT

A monitor, which may be closely associated with a handrail, may determine the amount of force applied to the handrail. The monitor may also determine the pattern in which force is applied to the handrail in order to assess how the user is contacting the handrail. The user's application of force to the handrail can be monitored along the course of movement along the handrail and may be compared to historical usage patterns.

13 Claims, 2 Drawing Sheets

MONITORING HANDRAILS TO REDUCE FALLS

BACKGROUND

This relates generally to devices that are useful in reducing the likelihood of falls by the elderly or the infirm.

Falling is a major cause of injury and mortality in elderly citizens. The risk of a fall in elderly people has been estimated at 30 percent per year for people older than 65 years of age. Of those who fall, 20 percent will need medical intervention, while 19 percent will result in a fracture. After the age of 65 years, one person in three will fall at least once a year, all of which makes falls the greatest cause of death in elderly people. Even non-injurious falls have significant negative consequences for the individual because of the fear of falling, functional deterioration, anxiety, depression, and loss of confidence. There is evidence that, if not detected and treated early enough, a person who is prone to fall may pass a threshold after which intervention for risk factors are inadequate to reduce further falls and to prevent a cascade of inevitable decline, loss of independence, and eventual institutionalization.

The elderly and infirm may use handrails for support. This may be due to lack of mobility, lack of balance, or reduced eyesight. Elderly or infirm people may use stair banisters and supporting handrails to support themselves as they move from one location within their home to another. Handrails are particularly common on stairways and in bathrooms and are frequently installed in other rooms as well.

DETAILED DESCRIPTION

Figure 1:
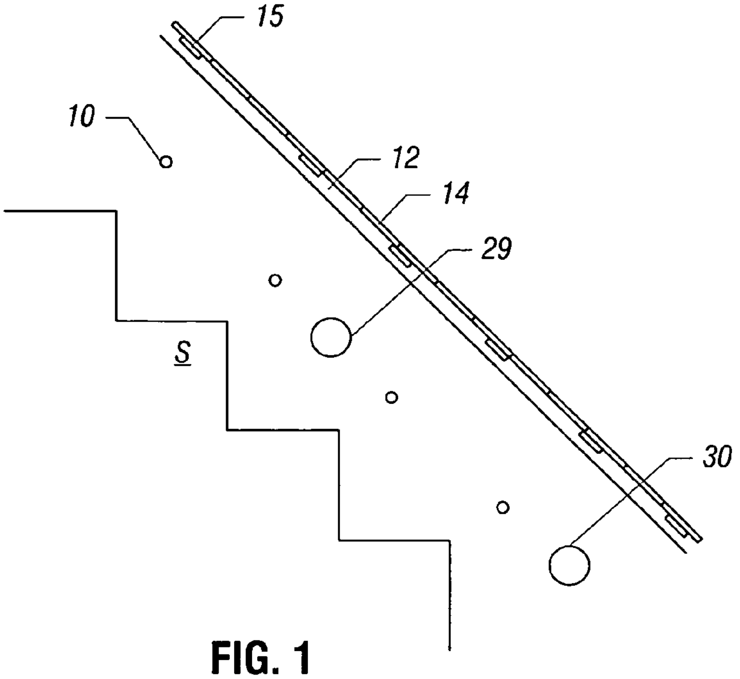
FIG. 1 is a front elevational view of one embodiment of the present invention.

Referring to FIG. 1, a handrail 12 is shown in position over a stairway indicated as S. However, the handrail may be positioned in a number of other locations as well, and may be along both inclined and horizontal walkways. For example, handrails may be provided in bathrooms proximate to toilets, sinks, bathtubs, and showers. They may also be provided along walkways in homes, hospitals, and other buildings.

The handrail 12 includes a force sensor 14 on its upper surface that detects the magnitude of an applied force, and the nature of applied force. By "nature of the applied force", it is intended to refer to the ability to determine information about a surface area that applies the force to the handrail. In some embodiments, this information may indicate whether the user is simply touching the handrail with fingertips, palms, or actually grasping the handrail.

In one embodiment, the sensor 14 may be a Kinotex® tactile force sensor, available from Tactex Controls, Inc., Victoria, B.C., Canada. This force sensor provides the information about both the magnitude of force, and the area through which the force is applied. The tactile force sensor may include a sensor that measures minute displacements due to forces applied on its surface. It may be constructed of plastic fiber embedded in foam. Thus, it may flexible or rigid and can operate with soft surfaces or from beneath durable wear layers. A single sensing element, called a taxel, is comprised of a send-and-receive fiber. Red light at 650 nanometers shines through the transmit fiber to illuminate the form. An external force compressing the foam increases the intensity of back-scattered light. The intensity of light is monitored by a receive fiber. The receive fiber is coupled to a photodiode that measures the light level returned from the received fiber.

The tactile force-sensing material 14 may be positioned over the entire length of the handrail 12 in some embodiments. This enables the monitoring of force while the user moves along the handrail 12. The material 14 can be used to determine how the handrail 12 is being used, when the force is applied, how much force is applied, how much dependence on the handrail is indicated, and how the handrail is being grasped, for example by wrapping the fingers around the handrail, by simply putting the palm on the handrail, or by touching the handrail with fingertips. Each of these items may raise risk factors, and may also be used over time to indicate changes in patterns of activity, which may be indicative of the need for assistance.

For example, increased dependence on the supporting handrail may indicate that the person is experiencing balance or gait difficulties indicating an increased possibility of a fall. A long-term trend of increasing dependency on the handrail may suggest that the user should be alerted to his or her increased imbalance and instability. In addition, the longterm monitoring trend of applied pressure by the user's hand on the rail during movement along the handrail can be used to indicate changing ambulatory confidence or the need for physical support. When a trend towards imbalance or instability is detected, a feedback mechanism may alert the user to the possibility of a fall or allow caretakers to monitor the person.

For example, a feedback mechanism in the form of an audio message may alert the user to be more careful based on the way that the user is using the handrail.

Another problem is that falls on stairs may be due in part to poor visibility. Light-dependent diodes 10 may be provided along the length of the handrail 12, for example near the stairs S, to monitor lighting conditions both at the top and bottom of the stairs. If the lighting condition is below a predefined level of illumination, a voice alert may prompt the user to turn on a light before moving along a handrail. This illumination condition may be examined when the person attempts to use the handrail, upon initial contact with the handrail sensor 14.

Data on the pressure applied to the handrail 12, dependency on the handrail 12, and usage patterns may be communicated by the handrail sensors 14 to a server (not shown) that can then be accessed by caregivers for review and trend analysis. For example, wireless networking communication may be used to communicate the information from a location where the user is present, such as in the home, to a location where caregivers are present, such as a hospital or doctor's office or other monitoring facility.

In one embodiment, the feedback to the user may be in the form of a vibrating array 15 embedded within the handrail 12. Upon feeling the vibration, the user is alerted to the imbalance situation, which may suggest the possibility of a fall and may be thereby advised to proceed more carefully or to summon assistance. The use of a vibratory feedback eliminates the possibility that those with impaired hearing may miss other warnings, especially audible warnings.

Figure 2:
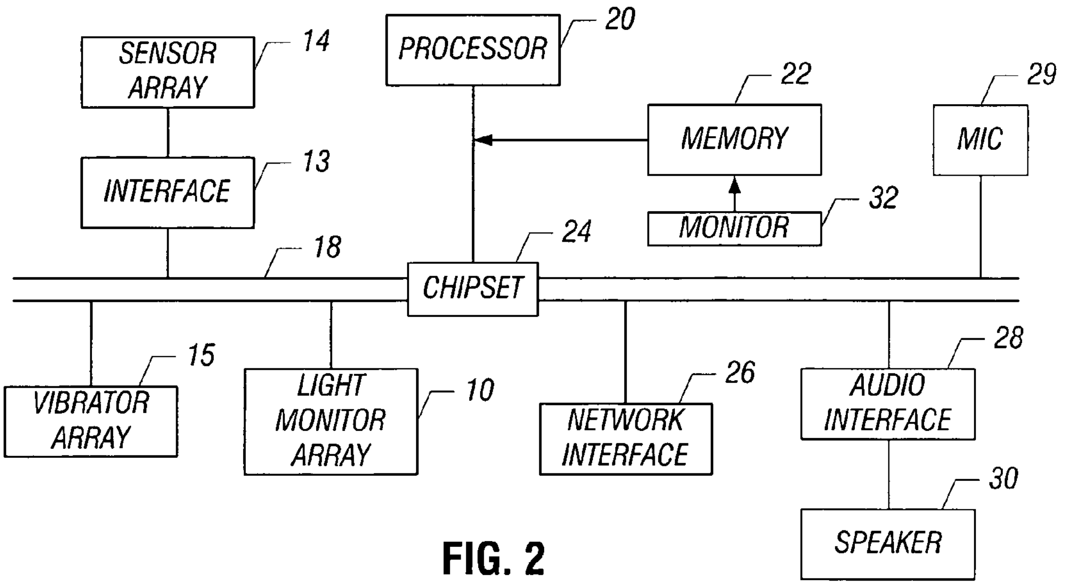
FIG. 2 is a schematic depiction of the embodiment of FIG. 1.

Thus, referring to FIG. 2, in accordance with one embodiment of the present invention, a processor-based system may include a processor 20. The system may be located at the user's premises or may be located remotely. The processor 20 may be coupled through a chipset 24 to a bus 18. The bus 18 may be coupled to an interface 16 to the sensor array 14. The processor 20 may also be coupled to a memory 22 storing a program 32 to be described hereinafter.

The chipset may also be coupled to a vibratory array 15 embedded within the sensor array 14. The vibratory array 15 may use piezoelectric actuators in one embodiment.

The light monitor array 10 may monitor the lighting conditions along the handrail. In some cases the array 10 may control the lights to turn the lights on automatically or to turn the lights on to a brighter level as needed.

A network interface 36 may provide wired or wireless communication to a remote server where a caregiver may be located in some embodiments.

An audio interface 28 may interact with a speaker 30 which may provide audible warnings to the user as described above. In some embodiments, a microphone 29 may be provided to enable the user to provide verbal information. This verbal information may involve an immediate feedback from the user, such as summoning help, or may be simply recorded and passed with other information for further analysis. For example, the user may simply indicate that the user is having difficulty with the stairs, and this together with the force information may be analyzed at the remote location at a subsequent time.

Figure 3:
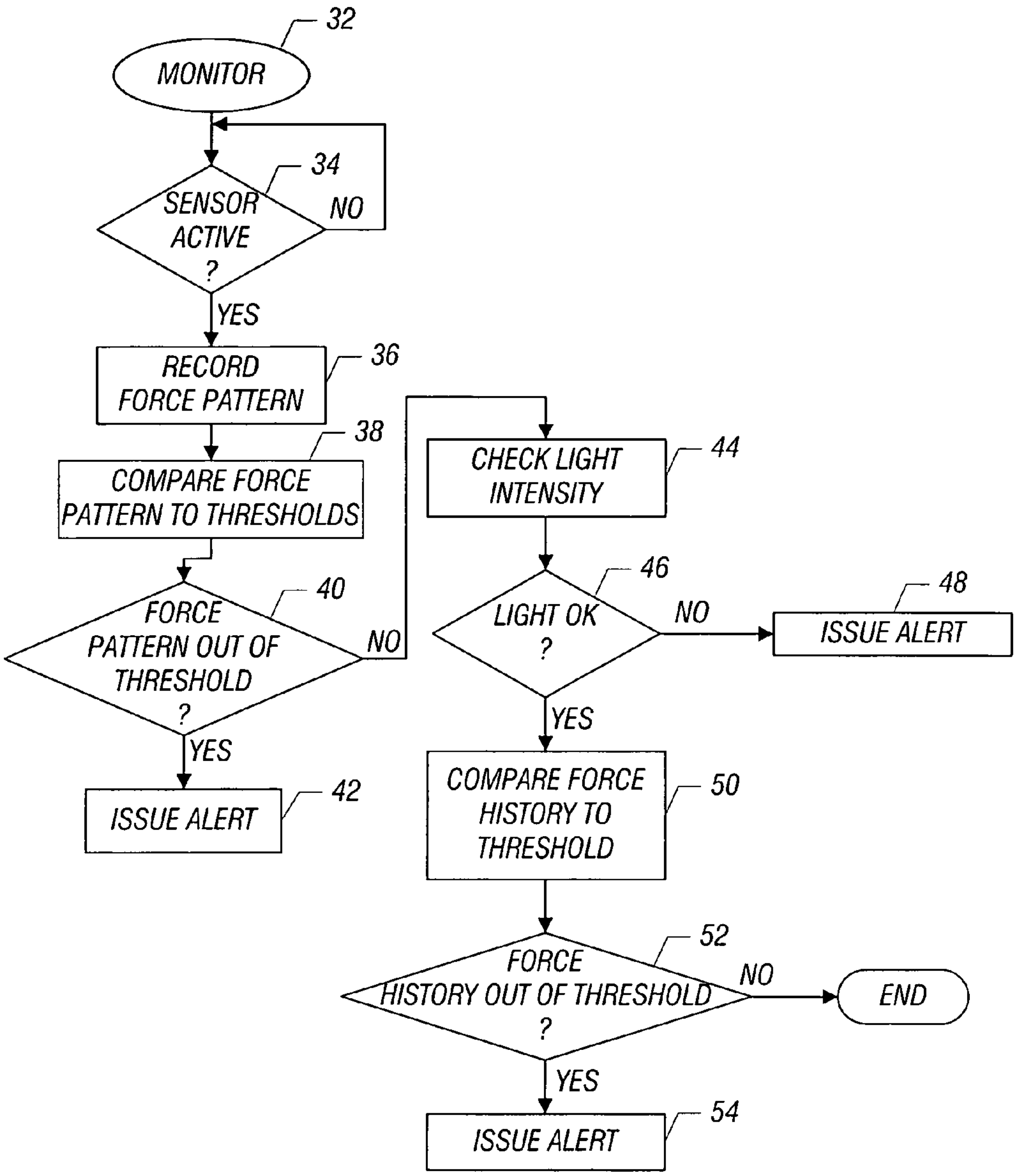
FIG. 3 is a flow chart for one embodiment of the present invention.

Referring to FIG. 3, in some embodiments, a monitor program 32 may be stored in the memory 22. In such case, the memory 22 may be a computer-accessible medium in the form of a semiconductor memory, a magnetic memory, or an optical memory, to give some examples.

In one embodiment, a check of diamond 34 determines whether the sensors 14 in the handrail 12 are active. They activate immediately upon touch by the user in one embodiment. For example, only the uppermost and lowermost sensors may be continually active and the others may be powered down. As soon as one of the sensors at the top or bottom of the stairway S is contacted, all the sensors may be immediately turned on. Whenever one of these upper or lower sensors is touched, the sensor active indication is returned at diamond 34, all the sensors are turned on, and the recording of a force pattern begins as indicated in block 36.

The recording of the force pattern may involve recording not only the magnitude of the force but also the area of contact. The area of contact may be transformed into a determination of whether the user is providing only fingertip contact, palm contact, or grasping contact of the handrail.

After the user has traversed at least an initial portion of the handrail 12, the pattern of applied force may be compared to thresholds, as indicated in block 38. Thus, as part of traversing the entire stairway, an initial assessment may be made. That assessment may involve an assessment of the real-time information as well as a comparison to historical patterns of usage to determine whether any indication that a dangerous situation has arisen may be derived. If the force pattern is out of the threshold or inconsistent with the pattern history, as determined in diamond 40, an alert may be issued at 42. This alert may be an audible alert, for example through the speaker 30, a vibratory alert through the vibratory array 15, or the summoning of assistance from a caregiver.

Next, a check at block 44 determines whether the light intensity along the handrail 12 is adequate. If not, as determined in diamond 46, an alert may be issued at block 48. The alert may again be an audible, vibratory, or remote notification alert. It may also actually involve activating lights to provide additional illumination.

If the lighting is okay, a check at diamond 50 compares the force history to a threshold. For instance, as more data is provided as the user traverses the handrail, better and better comparisons to force history may be achieved. If the force history is out of the threshold range, as determined in diamond 52, another alert of the type already described may be issued.

Other situations that may be monitored may be the lack of continued contact with the handrail after beginning contact. If it is determined that the user has neither continued up the stairway nor turned around and returned, based on contact with the handrail, an alert may be issued because it is possible that the user has actually fallen.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

receiving force data from one or more force sensors mounted on a handrail; and recording, based on the force data, a force pattern associated with use of the handrail;

monitoring a light level in a vicinity of the handrail; and outputting an activation signal to one or more vibrating actuators mounted on the handrail.

2. The method of claim 1, wherein recording the force pattern comprises recording a magnitude identified by the force data, a contact area identified by the force data, or any combination thereof.

3. The method of claim 1, further comprising determining, from the recorded force pattern, a long term trend of dependency on the handrail, wherein the long term trend includes a trend in pressure applied to the handrail, in contact area with the handrail, or any combination thereof.

4. The method of claim 3, further comprising determining, based on the long term trend of dependency on the handrail, whether a user using the handrail is prone to fall.

5. The method of claim 1, further comprising transmitting the force pattern to a server.

6. The method of claim 1, further comprising detecting, based on the force data, a discontinued contact with the handrail.

7. The method of claim 6, further comprising detecting, after a discontinued contact with the handrail, a continued contact with the handrail;

determining if the continued contact is moving along the handrail; and if the continued contact is not moving along the handrail, determining that a fall has occurred.

8. A monitoring apparatus comprising:

a handrail;

one or more force sensors mounted on the handrail, wherein the one or more force sensors are configured to output force data in response to a user's contact with the handrail;

a light sensor configured to monitor a light level in a vicinity of the handrail; and one or more vibrating actuators mounted on the handrail, wherein the apparatus is configured to cause the one or more vibrating actuators to activate.

9. The apparatus of claim 8, wherein the force data comprises a force magnitude, a contact area with the handrail, or any combination thereof.

10. The apparatus of claim 8, wherein one or more of the plurality of sensors are configured to be powered down until a force is detected at the handrail, and to power up in response to the detected force.

11. The apparatus of claim 8, further comprising a controller configured to receive the force data from one or more of the plurality of force sensors, and to determine a trend in a magnitude from the force data, a trend in contact area from the force data, or any combination thereof.

12. A method comprising:

receiving force data from one or more force sensors mounted on a handrail; and recording, based on the force data, a force pattern associated with use of the handrail;

monitoring a light level in a vicinity of the handrail; and outputting, based on a light level, an activation signal to a lighting system, an activation signal to a vibrating actuator, a voice alert, or any combination thereof.

13. A monitoring apparatus comprising:

a handrail;

one or more force sensors mounted on the handrail, wherein the one or more force sensors are configured to output force data in response to a user's contact with the handrail;

a light sensor configured to monitor a light level in a vicinity of the handrail; and outputting, based on the monitored light level, an activation signal to a lighting system, an activation signal to a vibrating actuator, a voice alert, or any combination thereof.

* * * * *